US008179062B2

(12) United States Patent
Germain et al.

(10) Patent No.: US 8,179,062 B2

(45) Date of Patent: May 15, 2012

(54) METHOD OF OPERATION FOR AN ELECTROMECHANICAL ACTUATOR FOR AN AWNING WITH ARMS

(75) Inventors: Florian Germain, Meythet (FR); Philippe Lozano, Taninges (FR); David Mugnier, Pers-Jussy (FR)

(73) Assignee: Somfy SAS, Cluses (FR)

( * ) Notice: Subject to any disclaimer, the term of this patent is extended or adjusted under 35 U.S.C. 154(b) by 772 days.

(21) Appl. No.: 12/268,587

(22) Filed: Nov. 11, 2008

(65) Prior Publication Data

US 2009/0120591 A1 May 14, 2009

(30) Foreign Application Priority Data

Nov. 13, 2007 (FR) .................................... 07 07959

(51) Int. Cl.
*H02P 3/00* (2006.01)

(52) U.S. Cl. ......... 318/266; 318/560; 318/280; 318/466

(58) Field of Classification Search .................. 318/266, 318/280, 279, 282, 284, 286, 466, 432, 480, 318/560; 160/70, 130
See application file for complete search history.

(56) References Cited

U.S. PATENT DOCUMENTS

| | | | | |
|---|---|---|---|---|
| 5,850,131 | A * | 12/1998 | Wolfer et al. | 318/466 |
| 6,201,364 | B1 * | 3/2001 | Will et al. | 318/466 |
| 6,465,980 | B1 * | 10/2002 | Orsat | 318/466 |
| 6,675,862 | B2 * | 1/2004 | Kobayashi et al. | 160/370.22 |
| 6,732,018 | B2 * | 5/2004 | Osinga | 700/275 |
| 7,382,063 | B2 * | 6/2008 | Mullet et al. | 307/64 |
| 7,728,542 | B2 * | 6/2010 | Bruno et al. | 318/469 |
| 2005/0237015 | A1 | 10/2005 | Fitzgibbon et al. | |
| 2007/0240832 | A1 * | 10/2007 | Cavarec | 160/70 |
| 2007/0247100 | A1 | 10/2007 | Bruno et al. | |

FOREIGN PATENT DOCUMENTS

| | | | |
|---|---|---|---|
| DE | G 9003416.3 | U | 3/1990 |
| DE | G 9306368.7 | U | 4/1993 |
| EP | 0 770 757 | A | 5/1997 |
| EP | 1 269 596 | A | 1/2003 |
| EP | 1 752 597 | A | 2/2007 |
| IT | MI2002A 001549 | | 7/2002 |

OTHER PUBLICATIONS

Search Report published by European Patent Office for priority European application 07 07959 mailed Jul. 4, 2008.
French translation of IT MI2002A 001549.

* cited by examiner

*Primary Examiner* — Walter Benson
*Assistant Examiner* — Antony M Paul
(74) *Attorney, Agent, or Firm* — Frommer Lawrence & Haug LLP; Ronald R Santucci

(57) ABSTRACT

A method of operating an electromechanical actuator (6) for an awning with arms (1), comprising a control unit (8), stop detection means (9) and means (7) for measuring a parameter ($U_{capa}$) of the actuator, the awning being able to move over its travel in at least a first (ZP1) and a second (ZP2, ZP3) positioning zone, the method comprising the following steps: upon detecting an initiating event, automatic determination, from the measurement of the parameter of the actuator, of the positioning zone in which the current position of the awning is located; and if the current position of the awning is located in the second positioning zone, temporary deactivation of the stop detection means for detecting a stop in the course of a movement of the awning towards a stop position.

11 Claims, 2 Drawing Sheets

METHOD OF OPERATION FOR AN ELECTROMECHANICAL ACTUATOR FOR AN AWNING WITH ARMS

This application claims priority benefits from French Patent Application No. FR 07 07959 filed Nov. 13, 2007, the disclosure of which is hereby incorporated by reference.

The invention relates to the field of automated solar protection, in particularly awnings driven by an actuator.

BACKGROUND OF THE INVENTION

A fabric forming the awning is designed to be wound onto a tube called the roller tube, the rotation of the latter being produced either by means of an electromechanical actuator or thanks to a manual operation device or a handle.

Tubular actuators are very commonly used for these automatic operations. They are located inside the roller tube and enable the fabric of the awning to be unwound or wound without particular effort. In addition, associated with automation or sensors, the operation of the awning may be remotely carried out, without the need for user intervention (for example, automatic unwinding in the presence of sun to protect both the terrace or the windows from too much heating in summer, automatic winding in the event of wind to protect the awning itself).

Electromechanical actuators are generally connected to the mains for their power supply. To provide for the event of urgent use in case of a power cut, some versions are proposed with an emergency control. The actuator then combines the automatic and manual functions.

For the operation of the actuator it is preferable that the latter knows the extension position of the awning, especially in order to manage the particular operations over different zones of the travel: arrival at the upper stop, arrival at the low point, locking zone of the extension arm of the awning.

DESCRIPTION OF THE PRIOR ART

Various solutions exist in the prior art for determining the position by counting, these dividing mainly into electronic or mechanical counting devices.

Mechanical counting devices are commonly used. A movement of the screen in one direction or the other is mechanically recorded by the counting device. Adjusting the limit of travel generally requires access to the actuator. Then, whatever the origin of movement (motorized or manual), the counting is active and positions are always properly located.

Electronic counting devices also have become available on the market. The current position is located in a non-volatile electronic memory, which enables the information to be preserved even in the event of a power outage. Adjustment of such an electronic counting device may be carried out at a distance, which obviously has many advantages, as the actuators are not easily accessible once fitted on site.

However, if such actuators with an electronic counting device are equipped with a manual emergency control, a manual movement carried out during a power outage may disturb the position counting: the awning is indeed moved without the electronic counting system changing the value of the current position. It is also unlikely that the awning will return to its initial position after this manual operation. The position in memory therefore no longer corresponds to the current position, in other words the installation is not properly adjusted.

This situation can be avoided by using absolute position sensors, but these are made of complex technology and rarely, or even never, used in the field of automated solar protection.

A simple practice consists of detecting each interruption of current and resetting the system to a hard stop (if there is one) each time. This has many disadvantages. Each micro-power outage may lead to a resetting. The latter is not well understood by the user, who notices that his or her installation is behaving curiously each time the mains power returns or not corresponding to the simple instruction given to raise or lower the solar protection.

Another solution, described in the patent application IT MI2002001549, consists in adding a second detection system that will enable counting to be carried out or more simply detecting a movement during an emergency manual operation. The second detection system is supplied with power by an energy storage means (supercapacitor type) that is recharged when a voltage is applied to the actuator. The installation will then be able to reset only in cases in which a manual operation has taken place. However, this solution requires the employment of new counting means apart from the existing means or adapted counting means, which further increases the price of devices with emergency operation.

Whatever solution is used, it is necessary to reset the installation when needed and/or automatically. This resetting is based on the recognition of a fixed position, such as a hard stop or a position in which it is no longer possible to continue moving and similar to a hard stop. The position of this stop can be determined by analyzing the torque or a variation in torque exerted by the motor or a lack of speed. These parameters are then independent of the counting position. The position of the stop is associated with a reference position value. The counting can then be updated from this reference position which represents the current position of the awning unambiguously.

The recognition of such a stop is known to the person skilled in the art. Patent EP 1 269 596 describes a device for stopping the motor when the load on the motor exceeds a predetermined value. It comprises means for converting the variation in voltage at the terminals of the phase-shifting capacitor, corresponding to a variation in the predetermined torque, into a chosen variation in the voltage whatever the maximum torque developed, means for comparing the converted voltage with a reference voltage and means for stopping the motor when the converted voltage is less than the reference voltage.

An automatic resetting procedure is known from document US 2005/0237015 in the field of motorized garage doors. In this type of installation, a manual operation is also foreseen which can be used when the actuator is without power. This document describes a system of locatable passpoints which define the limits of the operational zones. When reconnected to the power-supply network following a detected manual operation, the electronics of the installation determines which zone the door is positioned in on the basis of information specific to each zone, for example a voltage value specific to each zone. A preferred direction of movement is defined for each zone so as to be sure of reaching a passpoint where the position counter is reset.

The use of this system for a garage door requires the fitting of passpoint sensors or zone indicators distinguishing the operational zones, which increases the cost of the system.

Furthermore, this document proposes only the definition of a preferred direction of movement as the action to be implemented as a function of the zone in which the door is positioned.

In the case of the awning, a single stop and not a set of passpoints is enough to enable resetting. However, in order to locate this stop, it is necessary to activate the stop detection means, as mentioned above. It is also necessary to avoid activating these means in other zones of the travel, in particular in a zone called the arm-locking zone, where an increase in torque, variation in torque or lack of speed may express an event different from an arrival at a hard stop. The patent EP 0 770 757 thus describes activation of the stop detection means, called the load surveillance means, only during the return of the awning, just before reaching the initial position corresponding to the stop and not over the remainder of the travel, thus avoiding any untimely load. However, this method can be applied only if the position is known reliably, i.e. it is not suitable in the previously presented case in which the installation is not properly adjusted following a manual operation.

A method of controlling an awning is known from document DE 90 03 416. The awning comprises sensor means for determining the zone of travel in which a load bar of the awning is located. This document relates to a method for controlling an awning with multiple extension and retraction positions. These multiple positions are attained automatically depending on the surrounding wind conditions. The mode of operation described implies that the positions are located precisely. When there are variations in wind speed relative to a threshold value, the awning is brought into another position.

A method for managing the extension of a wind-sensitive awning is known from document EP 1 752 597.

A method for tensioning the fabric of an awning with arms in its completely extended position is known from document US 2007/0247100.

Means for stopping an awning with arms in extended positions and in the retracted position is also known from document US 2002/089209.

SUMMARY OF THE INVENTION

The aim of the invention is to provide a method of operating an actuator that solves the above mentioned problems and improves the methods of operation known from the prior art. In particular, when resetting is necessary, the invention allows prior determination in an overall manner of the position of the awning in order to authorize an automatic position reset without intervention by the user and without error. It also enables the use of fairly low detection thresholds so as not to damage the installation when detecting the stop.

DESCRIPTION OF THE DRAWINGS

The appended drawing represents, by way of example, an embodiment of a solar protection installation according to the invention and an implementation of a method for operating such an installation.

DESCRIPTION OF THE PREFERRED EMBODIMENTS

Figure 1:
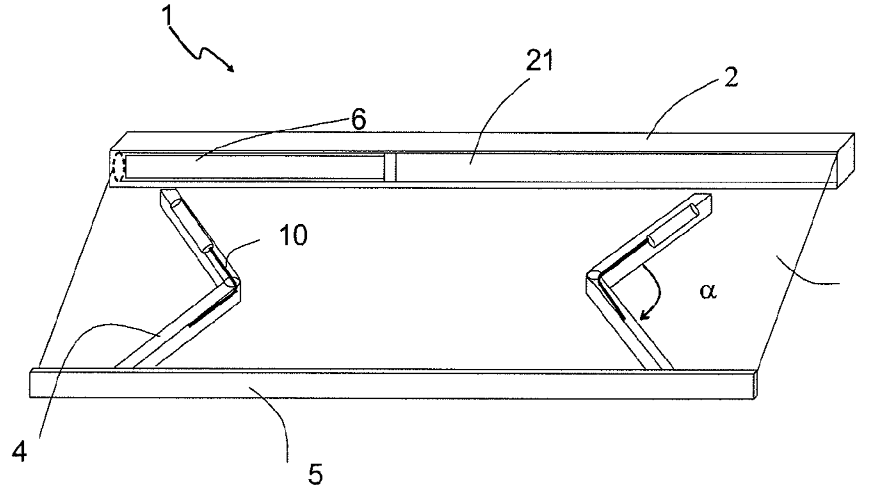
FIG. 1 is a diagram of a solar protection installation according to the invention.
Figure 2:
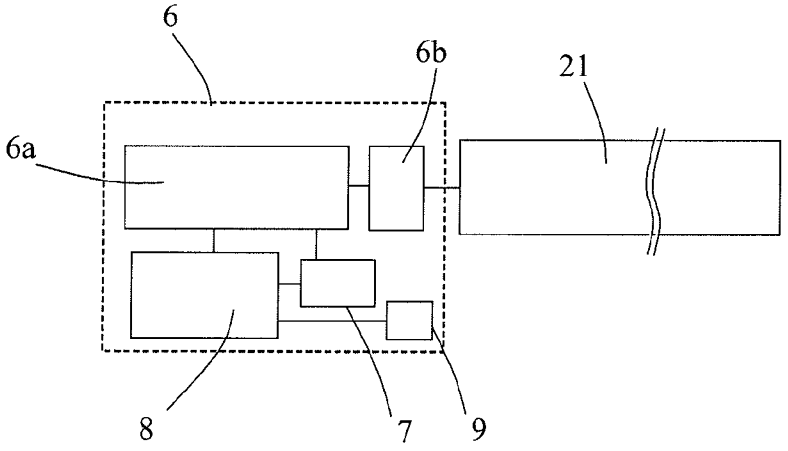
FIG. 2 is a diagram of an actuator of such an installation.

The solar protection installation 1, in particular a motorized awning with arms, comprises a roller tube 21 around which an awning fabric 3 is wound in a box 2. The installation also comprises hinged arms 4 mounted on one side on a bearing structure and equipped with springs 10 that are stretched when the arms are retracted. The other end of the arms is connected to a bar 5 fixed at the bottom of the fabric 3. A tubular actuator 6 inserted inside the roller tube 21 (or drive tube) causes the latter to rotate. The actuator comprises a control unit 8 allowing it to manage control commands to extend or retract the fabric. When there is a command to extend, the actuator permits an extension of the arms under the action of the springs and a rotation of the roller tube in a first direction, which leads to extension of the fabric. Conversely, when there is a command to retract, the actuator causes rotation of the roller tube in the opposite direction, which has the effect of tightening the fabric and of retracting the arms while stretching the springs.

The actuator 6 comprises a driver or geared motor part *6a* and a brake *6b*. The brake is able to obstruct rotation of the output axis so as to control the speed of rotation and also to keep the roller tube locked.

During extension of the fabric, the actuator 6 at least partly releases the brake *6b* and therefore allows rotation of the roller tube in the first direction under the action of the springs 10. The load bar 5 and the fabric 3 are then driven towards the completely extended position.

The actuator also comprises measurement means 7 for measuring an internal parameter of the actuator, representing the torque exerted by the actuator 6 on the tube 21 driving the fabric.

The actuator also comprises stop detection means 9. The means may, for example, operate by detecting a predetermined torque, a variation in torque or a predetermined variation in speed. The measurement means 7 and the stop detection means may be at least partly common. The stop detection means enable detection of the end stop of the travel to retract the awning (i.e. the position in which the awning is completely wound) or an obstacle in the travel of the load bar of the awning.

The electronic control unit 8 manages control commands to rotate the roller tube in one direction or the other, and manages stops, especially using information provided by the measurement means 7, the stop detection means 9 and/or a position sensor. The control unit also comprises software means for implementing a method of operation according to the invention, this method governing the operation of an actuator of an awning with arms. These software means comprise computer programs.

Figure 3:
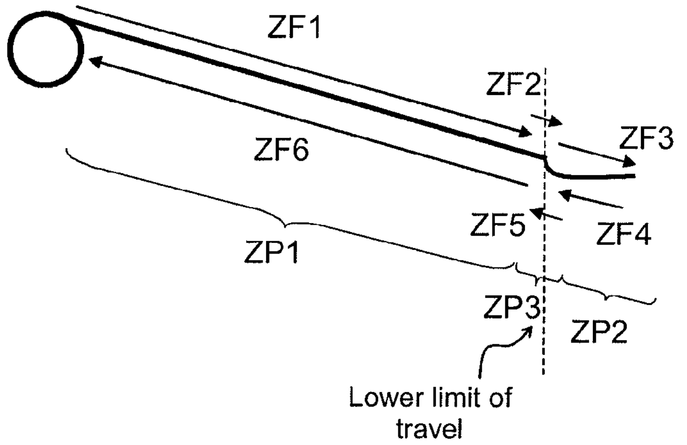
FIGS. 3, 4 and 5 are diagrams illustrating the principle of the method of operation according to the invention.

For such a terrace awning with arms, six particular operational zones (ZF) are distinguished:

These zones are marked in FIG. 3.

ZF1: when being extended, between the high position and the position called the arm-locking position, the latter corresponding generally to a lower limit of travel.

ZF3: when being extended, beyond the arm-locking position, the fabric hence unwinding freely.

ZF4: when being raised, before the arm-locking position, the fabric hence winding freely.

ZF6: when being raised, after this locking position.

ZF2, ZF5: border operational zones, corresponding to passing the particular position of the locking of the arms during extension and during retraction respectively.

Also distinguished are fabric positioning zones ZP1, ZP2, situated on both sides of the particular arm-locking position, and a positioning zone ZP3 corresponding to the zone of the arm-locking position.

An operational zone differs from a positioning zone in particular through the effect of the direction of movement.

Awnings with arms have the particular feature of being extended under the effect of springs linked to the arms, each arm being provided with a central hinge and capable of being extended slightly more than 180°. The particular position in which the arms are extended slightly beyond 180°, in a maximum stable position, is called the locking position.

When being extended in an operational zone ZF1, the arms therefore extend under the effect of the springs and pull the awning fabric, the actuator then being released or functioning as a generator. When the hinge is opened by more than 180°, called arm locking (operational zone ZF2) the fabric abruptly shifts from a stretched state to an unstretched state in so far as the arms have reached a position of maximum stable extension. They no longer stretch the fabric. The arms are then said to be locked. Beyond this, if the awning continues to be unwound, the operational zone ZF3 becomes applicable: the fabric unwinds freely.

Conversely, when being raised, if the fabric has been unwound in a mode of operation of the type ZF3, the fabric must be re-wound. As the fabric is unstretched, this movement causes only a very small load on the actuator. This mode of operation is hence a mode of operation in the zone ZF4.

Next, in an operational zone ZF5, the actuator must create a large torque in order to retract the arms from this arm-locking position, i.e. in order to unlock the arms and leave this stable position. In an operational zone ZF6 the actuator acts on the fabric and this must pull on the arms in order to bring them, against the action of the springs, into a retracted position.

If the trigger level of the stop detection means is low, in order not to risk damaging the awning when it arrives at the stop, passing this locking position may be considered by the stop detection means as equivalent to arriving at a stop. Depending on the real position of the awning during resetting, it may be impossible to reset the product to a real stop or even to learn a false reference position. These errors may lead to serious damage to the awning or undesired behaviors.

Some operational zones are, however, characterized by a particular signature linked with the torque, in particular with the voltage $U_{capa}$ at the terminals of a phase-shifting capacitor of an asynchronous motor. The measurement of the voltage $U_{capa}$ stands for an increase or a drop in torque depending on whether the actuator is functioning as a motor or a generator.

Figure 4:
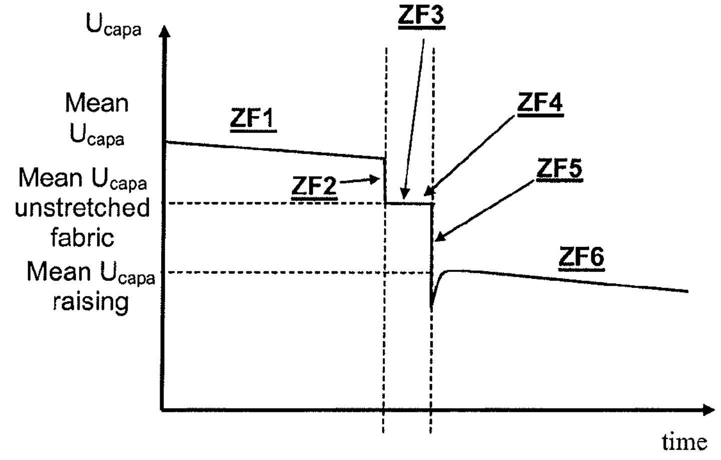

The various operational zones are marked on the graph of FIG. 4, showing the voltage taken at the terminals of the phase-shifting capacitor as a function of time over one operating cycle of extension and retraction.

The value of the voltage $U_{capa}$ alone does not, however, allow the positioning zone to be determined with certainty (the voltage value possibly varying according to various parameters such as temperature). In order to determine the positioning zone in which the awning is situated before resetting, the invention proposes carrying out a test defined by a short sequence of extension and retraction movements and analyzing the characteristics of the operational zones encountered (for example, the average value of the voltage $U_{capa}$ over each movement). These two values are then compared to determine the positioning zone of the awning.

Depending on the positioning zone the actuator defines whether it is necessary to render the stop detection inactive in order to pass the arm-locking position, or on the contrary to activate it in order to produce a reset towards a dead stop without damaging the product.

Figure 5:
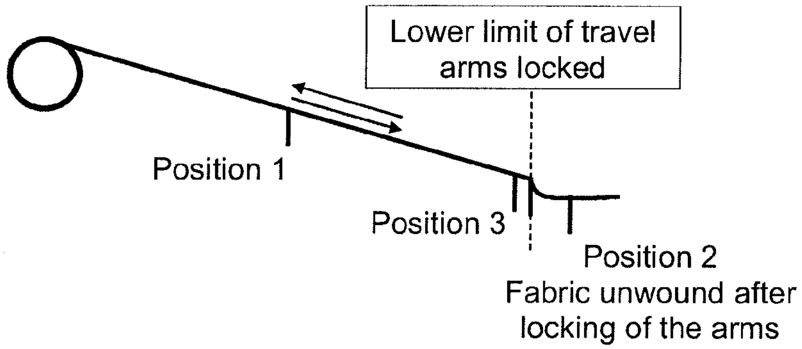
Figure 6:
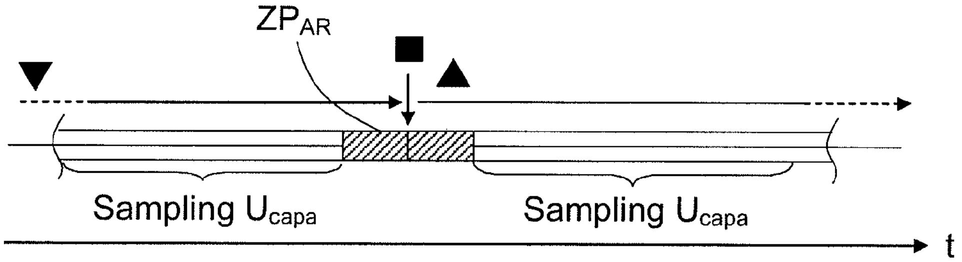
FIGS. 6 and 7 are diagrams illustrating the principles of parameter measurement used in the method of operation according to the invention.
Figure 7:
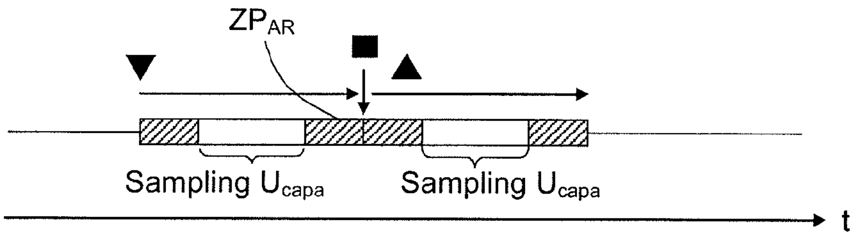

The operation is the following for the various positions defined in FIG. 5:

Starting from Position 1:

The operational zones successively encountered are ZF1 and ZF6 respectively. As the value of the parameter $U_{capa}$ (extension) in the zone ZF1 is greater than the value of the parameter $U_{capa}$(retraction) in the zone ZF6, the actuator deduces that the awning is in the positioning zone ZP1 and that the stop detection should be activated when being raised.

Starting from Position 2:

The operational zones successively encountered are ZF3 and ZF4 respectively. The forces to be provided by the actuator are solely to unwind and wind the unloaded fabric. As the value of the parameter $U_{capa}$(extension) in the zone ZF3 is approximately equal to the value of the parameter $U_{capa}$(retraction) in the zone ZF4, the actuator deduces that the awning is in the positioning zone ZP2 and that it is necessary to deactivate the stop detection for a first predetermined time when being raised, in order to pass the arm locking, then to reactivate it to detect the high stop.

Starting from Position 3 (During the Extension Phase, Arms Locked):

The operational zones successively encountered are ZF1/ZF2/ZF3 and ZF4/ZF5/ZF6 respectively. The moment the fabric is relaxed, i.e. the moment the arms lock, a large fall in the value of the voltage $U_{capa}$ occurs. A proper return to a position from the positioning zone ZP1 must therefore be ensured during the raising phase of the test. As a precaution, when being raised, the stop detection is deactivated for a second predetermined time, in order to pass the arm locking, then later activated to detect the high stop.

If the first test is not enough to determine the positioning zone, the actuator may repeat this test, optionally with longer periods of movement.

Other parameters dependent on the operation of the actuator may be used to determine the characteristics of the operational zones encountered during the test, for example the rotation/displacement speed. Advantageously, these parameters directly or indirectly represent the forces applied or the torque provided by the actuator.

The reset test is preferably part of a resetting movement in the course of which the values measured by the stop detection means are analyzed but are not taken into account for stopping, in other words, the stop detection is deactivated over at least part of this resetting movement. The aim of this resetting movement is to allow stabilization of operation and hence of the measurements useful for stop detection, before searching for a hard stop in order to reset the current position counter. Otherwise, the start of the actuator itself may distort the stop detection measurements.

This resetting movement therefore comprises a first extension movement (represented by the symbol ▼) for a duration of around 2 seconds, followed by stopping (represented by the symbol ■) and a retraction movement (represented by the symbol ▲) for at least 2 seconds. The resetting test preferably comprises data analysis of the back and forth travel of the awning, with the exception of measurements close to the kickturn position $ZP_{AR}$ of the awning.

It is also possible to test the position over a very short path. In the case represented in FIG. 5, each test movement lasts only around 300 ms, in the course of which the stop detection means provide sample measurements of the voltage $U_{capa}$. These are analyzed to deduce a mean for the voltage $U_{capa}$ at the kickturn position of the awning.

In the course of the samplings, the n first values, represented by the hatched areas, are not considered in order to account for the starting of the actuator and allow the measurement data to stabilize. By eliminating consideration of the n last values for back and forth travel sampling, symmetric sampling areas are ensured during extension and retraction.

Comparing the averages of samplings considered over the extension and retraction movements enables precise definition of the positioning zone $ZP_{AR}$ in which the awning is located at the moment of this kickturn. It is thus possible to deduce the positioning zone (ZP1, ZP2 or ZP3) at the time of the start of the resetting movement.

The positioning zones with risks of confusion are the areas ZP2 and ZP3. In these two cases, it is necessary to make sure that the stop detection means are temporarily deactivated to avoid confusing the locking or unlocking of the arms with the arrival at the high stop and hence storing an incorrect reference position.

In these two cases, however, the awning is close to its lower position. It is therefore possible to deactivate the stop detection means temporarily without risking arriving quickly at the high stop. The duration of the temporary deactivation of the stop detection means may then be chosen arbitrarily to suit all types and sizes of awning. It may, for example, be equal to 2 seconds.

The invention claimed is:

1. A method of operating an electromechanical actuator (6) for an awning with arms (1), comprising a control unit (8), stop detection means (9) and means (7) for measuring a parameter ($U_{capa}$) of the actuator, the awning being able to move during its travel in at least a first (ZP1) and a second (ZP2) positioning zone, the method comprising the following steps:

upon detecting an initiating event, automatic determination, from the measurement of the parameter of the actuator, of the positioning zone in which the current position of the awning is located; and if the current position of the awning is located in the second positioning zone, temporary deactivation of the stop detection means for detecting a stop in the course of a movement of the awning towards a stop position, the second positioning zone extending beyond an arm-locking position of the awning.

2. The method of operation as claimed in claim 1, wherein the initiating event is a need to reset the position of the awning.

3. The method of operation as claimed in claim 1, wherein the initiating event is mains power outage longer than a given duration.

4. The method of operation as claimed in claim 1, wherein the positioning zone is determined from characteristics of operational zones, the characteristics of various operational zones of the actuator reached by the awning during its travel being provided by the measurement of the parameter of the actuator.

5. The method of operation as claimed in claim 4, wherein the automatic determination step comprises the following phases:

measurement of values of the operational parameter of the actuator during a sequence of movements moving the awning in at least two operational zones;

analysis of the measured values of the parameter of the actuator; and determination of the positioning zone in which the current position of the awning is located according to the result of the analysis phase.

6. The method of operation as claimed in claim 5, wherein the sequence of movements comprises a movement extending the awning followed by a movement retracting the awning.

7. The method of operation as claimed in claim 1, wherein the automatic determination step is carried out again in the event that it was not possible to determine the positioning zone containing the current position of the awning.

8. The method of operation as claimed in claim 7, wherein, during the reiterations of the automatic determination step, the movements of the sequence are carried out over extended travels or for a time greater than the duration of the movements in the course of the first iteration.

9. The method of operation as claimed in claim 1, wherein the temporary deactivation of the stop detection means takes place for a first predetermined period if the awning is located in a first part of the second positioning zone and for a second predetermined period if the awning is located in a second part of the second positioning zone.

10. The method of operation as claimed in claim 1, wherein the parameter of the actuator is an actuator speed or an actuator torque.

11. A non-transitory computer-readable storage device having stored thereon a program for causing actuator (6) for an awning with arms (1) comprising a control unit (8), stop detection means (9) and means (7) for measuring a parameter of the actuator, to implement the method of operation as claimed in claim 1.

* * * * *